United States Patent [19]

Yamada et al.

[11] Patent Number: 5,177,719
[45] Date of Patent: Jan. 5, 1993

[54] DATA TRACK ACCESSING APPARATUS

[75] Inventors: Shinichi Yamada, Hirakata; Mitsuro Moriya, Neyagawa; Hiroyuki Yamaguchi, Hirakata, all of Japan

[73] Assignee: Matsushita Electric Industrial Co., Ltd., Osaka, Japan

[21] Appl. No.: 417,426

[22] Filed: Oct. 5, 1989

[30] Foreign Application Priority Data

Oct. 5, 1988 [JP] Japan ............................ 63-251181
Dec. 16, 1988 [JP] Japan ............................ 63-319030
Jun. 15, 1989 [JP] Japan ............................ 1-153388

[51] Int. Cl.⁵ .......................................... G11B 7/085
[52] U.S. Cl. .................................. 369/32; 369/59;
    369/44.11; 369/44.34; 369/44.35
[58] Field of Search .................... 369/32, 44.23, 44.25,
    369/44.27, 44.28, 44.32, 44.34, 44.35, 54, 59, 47,
    33, 43, 124; 360/78.04, 78.06, 78.09, 73.01,
    73.04

[56] References Cited

U.S. PATENT DOCUMENTS 4,096,534  6/1978  Brownback et al. ............. 360/78
4,416,002  11/1983  Oguino et al. ................. 369/44.27
4,755,980  7/1988  Yoshimaru et al. ............. 369/44.25

Primary Examiner—Robert Weinhardt
Assistant Examiner—Hung Dang
Attorney, Agent, or Firm—Wenderoth, Lind & Ponack

[57] ABSTRACT

A data-track accessing apparatus effectively eliminates external disturbance components from a track-deviation signal and correctly locates an objective track at an extremely fast speed. The apparatus includes an actuator which transfers a light beam in a direction of traversing tracks, a track-deviation detecting circuit which detects an amount of track deviation when the light beam traverses the tracks, a binary-coding circuit which converts the detected track-deviation signal into a binary-coded signal, an external-disturbance-component removal circuit which removes external disturbance components from the binary-coded track-deviation signal, and a speed-discriminating circuit which discriminates the moving speed of the light beam into multiple stages based on an output signal from the removal circuit.

11 Claims, 12 Drawing Sheets

DATA TRACK ACCESSING APPARATUS

BACKGROUND OF THE INVENTION

1. Field of the Invention

The present invention relates to a data track accessing apparatus which accesses a desired track on a record carrier incorporating a number of tracks.

2. Description of the Prior Art

Conventionally, there is an optical data reproduction apparatus which, as a data storage apparatus, focusses and radiates a light beam emitted from a light source, such as a semiconductor laser, on a disc-shape record carrier rotating at a constant rotation speed.

A number of extremely fine tracks each having a 0.6 micron width and 1.6 micron pitch are spirally disposed or are concentrically disposed on the record carrier. For reproducing signals recorded on the record carrier, tracking control is executed to position the light beam on a track, and a photodetector detects the light beam reflected from the record carrier. When executing the tracking control operation to correctly position the light beam on a track, a track-deviation signal is also detected from the light beam reflected from the record carrier. Tracking control is effected by feeding the track-deviation signal back to a tracking actuator which moves the light beam on the record carrier in a direction generally perpendicular to the track direction.

A number of tracks are formed on the record carrier. The track access function is essential for the system to correctly position the light beam on a desired track.

Track access is executed by initially locking the tracking control system, and then, by driving the tracking actuator toward the desired track so that the light beam can traverse tracks, the tracking control operation is reactivated on the objective track. To stably perform access at a very fast speed, speed control is executed during the access operation so that the light beam can move at a predetermined speed. Data of the moving speed and position of the light beam is necessary for executing the speed control. The moving speed of the light beam is detected from the period of the track-devation signal generated while the light beam moves across the tracks. The position of the light beam is detected by detecting a track-traverse signal designating that the light beam has transversed the center of each track from each track-deviation signal, followed by counting the number of the track-traverse signals from the access starting track. The track-deviation signal contains external disturbance components such as disc damage, influence of the address signal, or various noise components. To precisely detect the speed and position of the light beam, these external disturbance components must be removed. The frequency of the external disturbance components is variable by the moving speed of the light beam. The faster the speed of the light beam, the higher the frequency of the external disturbance components.

The maximum moving speed of the light beam during the access operation is about 1 meter per second, whereas the minimum speed of the light beam just before arriving at the objective track is about 5 mm per second. Accordingly, the frequency of the track-deviation signal is variable throughout an extensive range between 300 Hz and 600 KHz, and thus, it is quite difficult for any conventional circuit having a single characteristic to fully remove those external disturbance components.

To solve this problem, as described in the U.S. Pat. No. 4,096,534, there is such a system which removes external disturbance components by switching characteristics of an analog filter into two stages according to the rotating speed of the magnetic head. However, since this conventional system is based on the hypothesis for determining the frequency of the track-deviation signal to be a maximum of 7 KHz, it is necessary for the system to perform multi-stage switching of characteristics of the analog filter to fully remove external disturbance components from the track-deviation signal having a frequency which is variable in a vast range from 300 Hz to a maximum of 600 KHz. This in turn results in an increased number of capacitors, transistors, and other circuit elements, thus unavoidably expanding the size of circuits. Furthermore, in order to remove noise spike components, it is necessary for the conventional system to sharply reduce the characteristic of the analog filter beyond the cutoff frequency, thus eventually resulting in the complicated circuit structure and an increased number of circuit elements.

SUMMARY OF THE INVENTION

A primary object of the invention is to provide a novel data-track accessing apparatus which is capable of stably controlling the moving speed of the reproduction position and correctly accessing an objective track.

To achieve the above object, a data-track accessing apparatus according to the invention comprises: conversion means for reproducing data signals from a record carrier having formed thereon a plurality of tracks; track deviation detecting means for detecting a deviation of a reproduction position from a track position on the record carrier; transfer means for transferring the reproduction position on the record carrier to traverse the tracks on the record carrier; binary-coding means for converting an output signal from the track deviation detecting means into a binary-coded signal; signal processing means for removing external disturbance components from the binary-coded signal; speed-discriminating means for detecting from an output signal from the signal processing means that a relative transfer speed of the reproduction position to the tracks has reached a predetermined speed and for changing a characteristic of the signal processing means for removing the external disturbance components; and control means for controlling the transfer means to access an objective track based on the output signal form the signal processing means.

With the above configuration, the external disturbance components can be effectively removed even when the frequency of the track-deviation signal varies in a wide range (e.g. 300 Hz–600 kHz) or when the external components include spike signals. Therefore, it is possible to perform a stable track access operation.

DESCRIPTION OF THE PREFERRED EMBODIMENTS

Referring now more particularly to the accompanying drawings, a preferred embodiment of the data-track accessing apparatus according to the invention will be described below.

Figure 1:
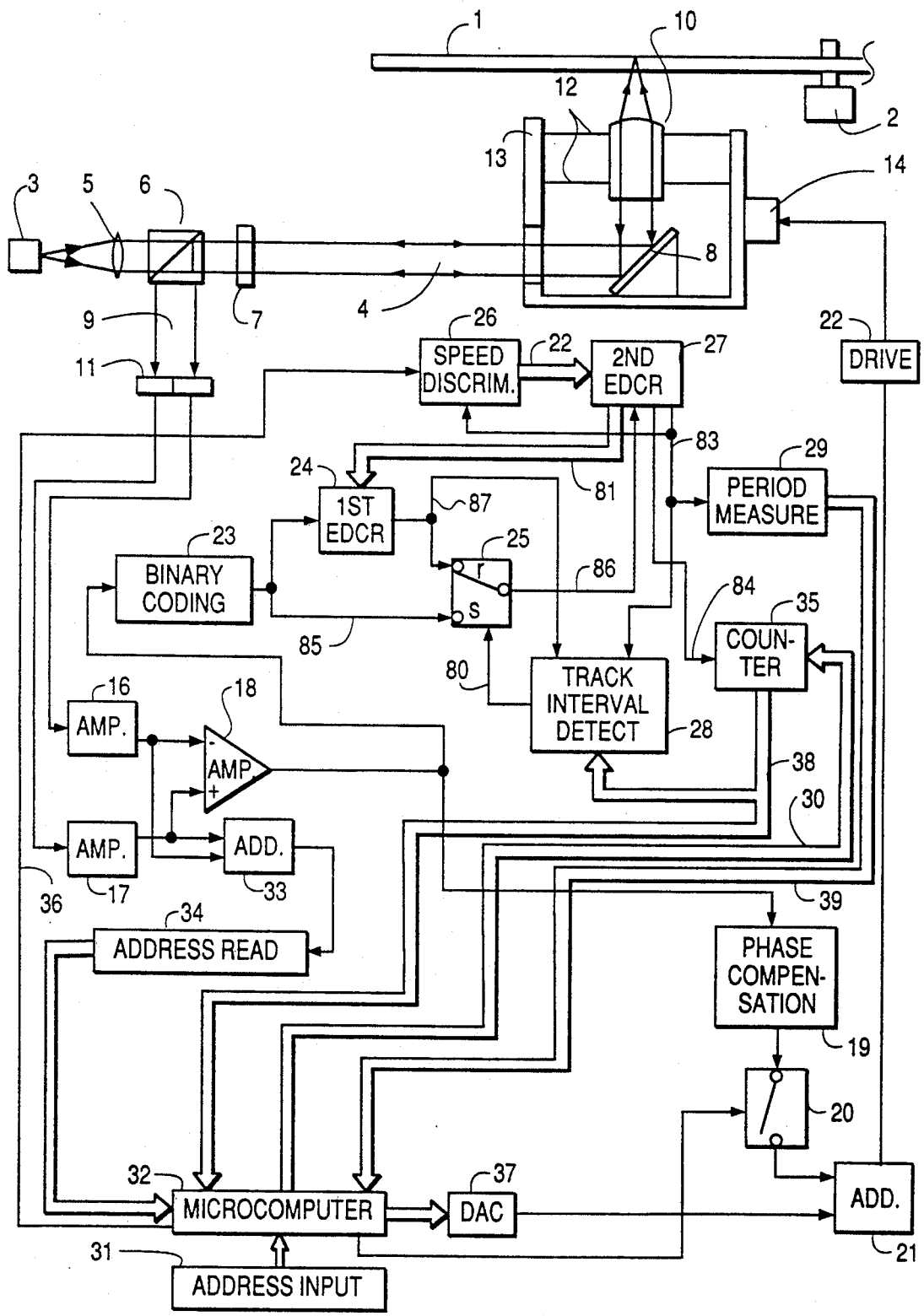
FIG. 1 is a schematic block diagram of an embodiment of a data-track accessing apparatus, according to the invention.

Referring to FIG. 1, plurality of tracks each containing recorded signals and having a 0.6 micron of width and 1.6 micron track pitch are spirally disposed on a record carrier 1. Address signals are recorded on respective tracks for discriminating each track.

A light beam 4 emitted from a light source 3, such as a semiconductor laser for example, is converted into a parallel beam by a coupling lens 5, and then permeates a polarization beam splitter 6 and a ¼ wave length plate 7. The light beam 4 is then reflected by a total reflection mirror 8, and then, the reflected beam is focussed by a converging lens 10 onto the record carrier 1. The lens 10 is secured to an actuator frame 13 with a pair of flat springs 12 which elongate and contract themselves only in the direction perpendicular to the surface of the record carrier 1. Although focus of the converging lens 10 is controlled so that the diameter of light beam 4 on the record carrier 1 can remain constant, this operation is not directly related to the invention, and thus the description thereof is omitted.

A reflected light beam 9 from the record carrier 1 permeates the lens 10, and is then reflected by the total reflection mirror 8. After permeating the ¼ wave length plate 7, the light beam 9 is reflected by the polarization beam splitter 6 to enter a photodetector 11. The total reflection mirror 8 and a coil 14 are secured to the frame 13. When current flows through the coil 14, the coil 14 generates an electromagnetic force to move the frame 13 in the radial direction of the record carrier 1.

When the frame 13 moves in the radial direction of the record carrier 1, the lens 10 secured to the frame 13 via the flat springs 12 moves together with the frame 13. As a result, the light beam 4 on the record carrier 1 moves in the radial direction of the record carrier 1 in correspondence with the movement of the frame 13.

The light source 3, coupling lens 5, polarization beam splitter 6, ¼ wave length plate 7, and photodetector 11 are mounted on a frame (not shown) of the data-track accessing apparatus.

The photodetector 11 is split into two parts. Signals outputted from the photodetector 11 are amplified by amplifiers 16 and 17. The amplified signals from the amplifiers 16 and 17 are then transmitted to a differential amplifier 18, which then outputs a signal corresponding to a difference between the output signals of the amplifiers 16 and 17.

The output signal from the differential amplifier 18 is a track-deviation signal which designates a deviation of the position of the beam 4 focussed on the record carrier 1 from a track. When the wave length of the light source 3 is λ, the track-deviation signal can be extracted from a track having a concave and convex structure with an optical depth of about λ/8 by applying the "push and pull" method. This art is fully described in the Japanese Patent Publication No. 59-9085 of 1984 or the French Patent Publication No. 7529707, and thus, a description of this art is omitted.

The track-deviation signal is transmitted to the coil 14 via a phase-compensation circuit 19 compensating for the phase of the tracking control system, a switch 20, an addition circuit 21, and a driving circuit 22 for amplifying the electric power. As a result, the light beam 4 on the record carrier 1 is subjected to the tracking control operation so that the light beam 4 can always be positioned on a track.

The output signals from the amplifiers 16 and 17 are also transmitted to an addition circuit 33. This circuit outputs a signal which is substantially a reproduced signal brought from the record carrier 1 and contains an address data of the track. The output signal from the addition circuit 33 is transmitted to an address-reading circuit 34 which reads the address data.

An address-input circuit 31 receives an address of an objective track that should be accessed. An output signal from the address-input circuit 31 is transmitted to a microcomputer 32. When the address of the objective track is inputted to the address-input circuit 31, the microcomputer 32 identifies the address of the objective track and the present track address in which the light beam 4 on the record carrier 1 is present. To simplify the explanation, the following description refers to the address of the objective track as "N0" and the present track address as "N1" where N0>N1.

The microcomputer 32 computes the number of tracks from the present track up to the objective track (N0-N1), and then preliminarily sets the value of (N0-N1) to a counter circuit 35 via a data bus line 30.

The microcomputer 32 incorporates a table of reference speeds corresponding to the number of tracks up to the objective track. The microcomputer 32 seeks a reference speed corresponding to the number of tracks (N0-N1) from the reference speed table and outputs the corresponding value to a digital-analog converter (DAC) 37, and then disables the tracking control operation by opening the switch 20.

An output signal from the DAC 37 is transmitted to the coil 14 via the addition circuit 21 and the driving circuit 22 to move the frame 13 in the direction toward the objective track.

When the light beam 4 on the record carrier 1 traverses the tracks, the differential amplifier 18 generates a sinewaveform track deviation signal with a track pitch as a cycle. This signal contains external disturbance components due to disc damage, influence of the address signal, and other noise sources. This signal is transmitted to a binary-coding circuit 23.

The binary-coding circuit 23 converts the input signal into a binary-coded signal, which is then transmitted to a first external-disturbance-component removal (EDCR) circuit 24 and a terminal "s" of a switch 25.

The first external-disturbance-component removal circuit 24 measures a duration of a HIGH LEVEL or LOW LEVEL period of the input binary-coded signal, and then removes pulses each having a HIGH LEVEL or LOW LEVEL period shorter than a predetermined time W, and then transmits the remaining pulses to a terminal "r" of the switch 25 and a track-interval detection circuit 28. There are five grades of values for the time W, where these grades can be switched according to an output signal from a second external-disturbance-component removal (EDCR) circuit 27 via a data bus line 81.

The switch 25 selects the signals received via the terminals "r" and "s", and outputs a selected signal to the second external-disturbance-component removal circuit 27 via a line 86. The switching of the switch 25 is controlled by an output signal from the track-interval detection circuit 28 via a line 80.

The second EDCR circuit 27 removes pulses generated within a period of a predetermined time M from each rising edge and each falling edge of the input signal, and transmits pulses designating rising and falling edges after completion of the noise-component removal operation to a period-counting circuit 29, the track-interval detection circuit 28, and the speed-discriminating circuit 26 via a line 83. The pulse designating the falling edge is transmitted to a counter circuit 35 via a line 84. The pulse designating the rising and falling edges indicates that the light beam 4 has moved across a half track which corresponds to 0.8 micron. In the following description, this pulse is referred to as the "0.5-track-moved signal". The pulse designating the falling edge indicates that the light beam 4 has just moved across a track. This pulse is hereinafter referred to as the "track-traversed signal". There are five grades of values for the time M. The selection of a value of the time M is executed by the speed-discriminating circuit 26 via the data bus line 82. After selecting the time M, the second EDCR circuit 27 outputs a data received from the speed-discriminating circuit 26 via the data bus line 82 to the first EDCR circuit 24 via the data bus line 81.

The speed-discriminating circuit 26 discriminates the moving speed of the light beam 4 into one of the five grades by referring to the period of the 0.5-track-moved signal received via the line 83, and then based on the result of the discrimination, the speed-discriminating circuit 26 selects the time M of the second EDCR circuit 27 and the time W of the first EDCR circuit. The speed discrimination is controlled by the microcomputer 32 via the line 36. The period-counting circuit 29 counts the period of the 0.5-track-moved signal received via the line 83.

The counter circuit 35 counts down by one whenever receiving the track-traversed signal via the line 84. As mentioned earlier, since the number of tracks up to the objective track is already set at the moment immediately before starting the track accessing process, the count value of the counter circuit 35 designates the number of tracks from the present position of the light beam 4 to the objective track.

The microcomputer 32 reads the value counted by the period-counting circuit 29 via the data bus line 39, and then computes the moving speed of the light beam having moved across 0.5 track. Assume that the track pitch is P and the time spent by the light beam 4 for moving across 0.5 track counted by the period-counting circuit 29 is T, then, the velocity V is determined by equation $V = 0.5 \times P/T$. The microcomputer 32 also reads the number of tracks up to the objective track through the counter circuit 35 via the data bus line 38, and then selects a corresponding reference speed from the reference speed table. The microcomputer 32 then computes a difference between the computed velocity V and the reference speed, and finally, it outputs a value corresponding to the difference to the DAC 37.

When the value counted by the counter circuit 35 is reduced to zero, in other words, when the light beam has just arrived at the objective track, the microcomputer 32 resets the value outputted from the DAC 37 and also closes the switch 20 to reactivate the tracking control operation, thus completing the track accessing operation.

The first EDCR circuit 24 measures the period of HIGH LEVEL or LOW LEVEL of the received signal, and then compares it to the time W to check to see if the period of HIGH LEVEL or LOW LEVEL of the received signal lasts longer than the time W. As a result, the output signal from the first EDCR circuit 24 delays itself from the input signal by the time W spent for performing the comparison. This delay causes a delay of the detection of the objective track for the time W. The light beam 4 is brought back to the objective track after passing through the center of the objective track, and thus, the light beam cannot stably be brought back to the objective track. To prevent this, the track-interval detection circuit 28 detects a near center position between the objective track of the address (N0) and the track of the address (N0-1) which is one track before the objective track, and then, the track-interval detection circuit 28 switches the terminal "r" of the switch 25 to the terminal "s" via the data line 80. When the output signal from the switch 25 is transmitted to the terminal "s", the output signal from the binary-coding circuit 23 is directly delivered to the second EDCR circuit 27 so that the objective track can be detected without delay.

Figure 2A:
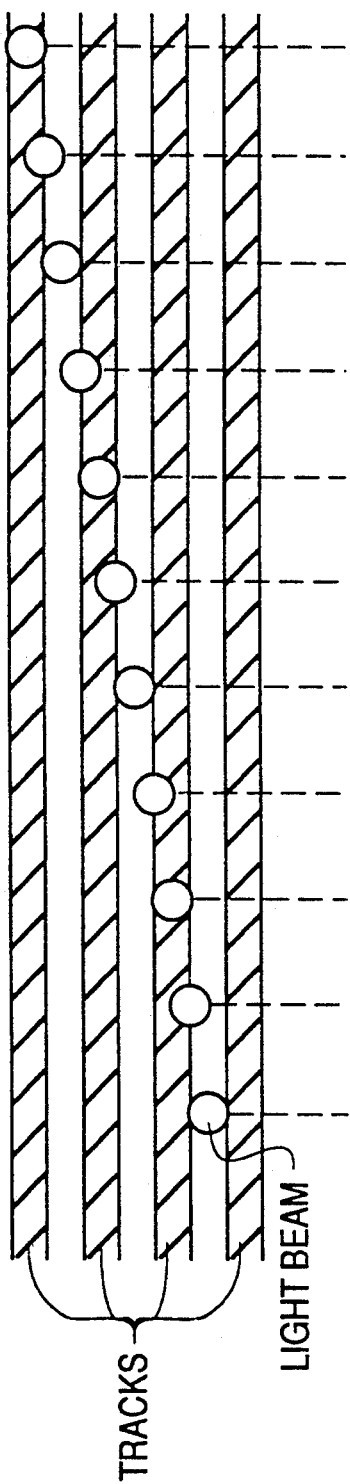
FIGS. 2(a)–(c) constitute a graphic chart illustrating a track-deviation signal and a binary-coded signal when a light beam traverses tracks.
Figure 2B:
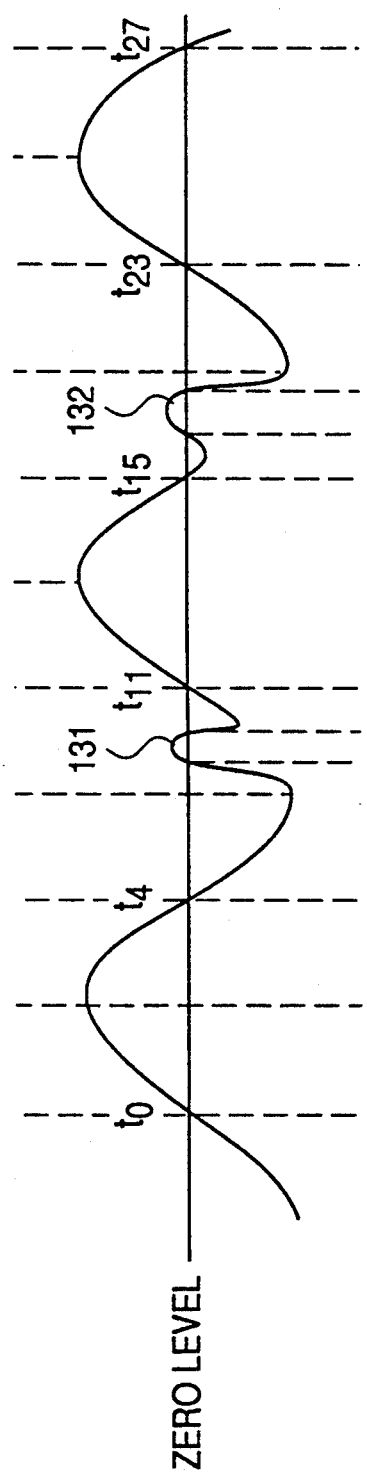
Figure 2C:
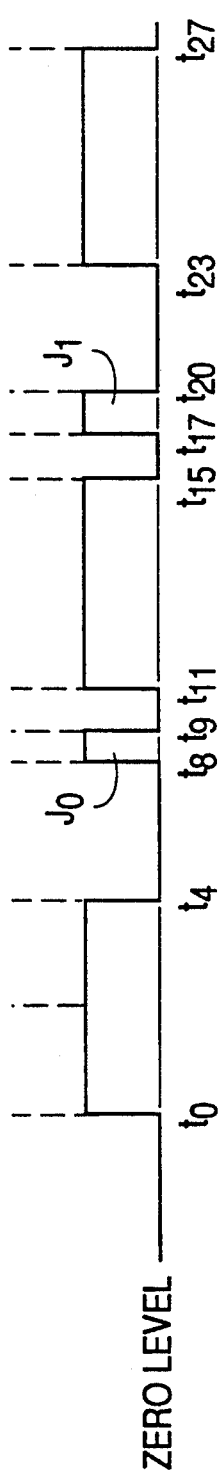

Next, referring now to FIG. 2, the operation of the binary-coding circuit 23 shown in FIG. 1 is described. FIG. 2(a) designates the state in which the light beam 4 traverses a plurality of tracks at a constant speed in a period of time shown in the horizontal axis. FIG. 2(b) designates the track-deviation signal when the light beam 4 traverses a plurality of tracks as shown in FIG. 2(a). As shown in FIG. 2(a), the light beam 4 is present in the center position between tracks at each of times t0, t11, and t23, whereas the light beam is present in the center of a track at each of times t4, t15, and t27. The reference numerals 131 and 132 shown in FIG. 2(b) respectively designate examples of external disturbance components caused by disc damage or influence of the address signal. FIG. 2(c) designates a waveform of the output signal from the binary-coding circuit 23 when the waveform of FIG. 2(b) is inputted. The waveform of FIG. 2(c) is the binary-coded track-deviation signal derived from the waveform of FIG. 2(b) using the zero level as a reference level. The rising edge at each of t0, t11, and t23 shown in FIG. 2(c) designates that the light beam has just arrived at the center position of a track. This in turn designates that the period from t0 to t4 corresponds to the time in which the light beam moves across a half track. Likewise, each of periods from t4 to t11, from t11 to t15, from t15 to t23, and from t23 to t27 corresponds to a time in which the light beam moves across a half track. Pulses J0 and J1 shown in FIG. 2(c) are generated as a result of the presence of the external disturbance components 131 and 132. Although the output signal from the binary-coding circuit 23 rises at t8 and t17, at which, actually, the light beam is not in the center position between tracks. Likewise, even if the output signal from the binary-coding circuit 23 falls at t9 and t20, the light beam is not in the center position of a track.

Next, referring now to FIG. 3, the first external-disturbance-component removal circuit 24 shown in FIG. 1 is described below.

Figure 3:
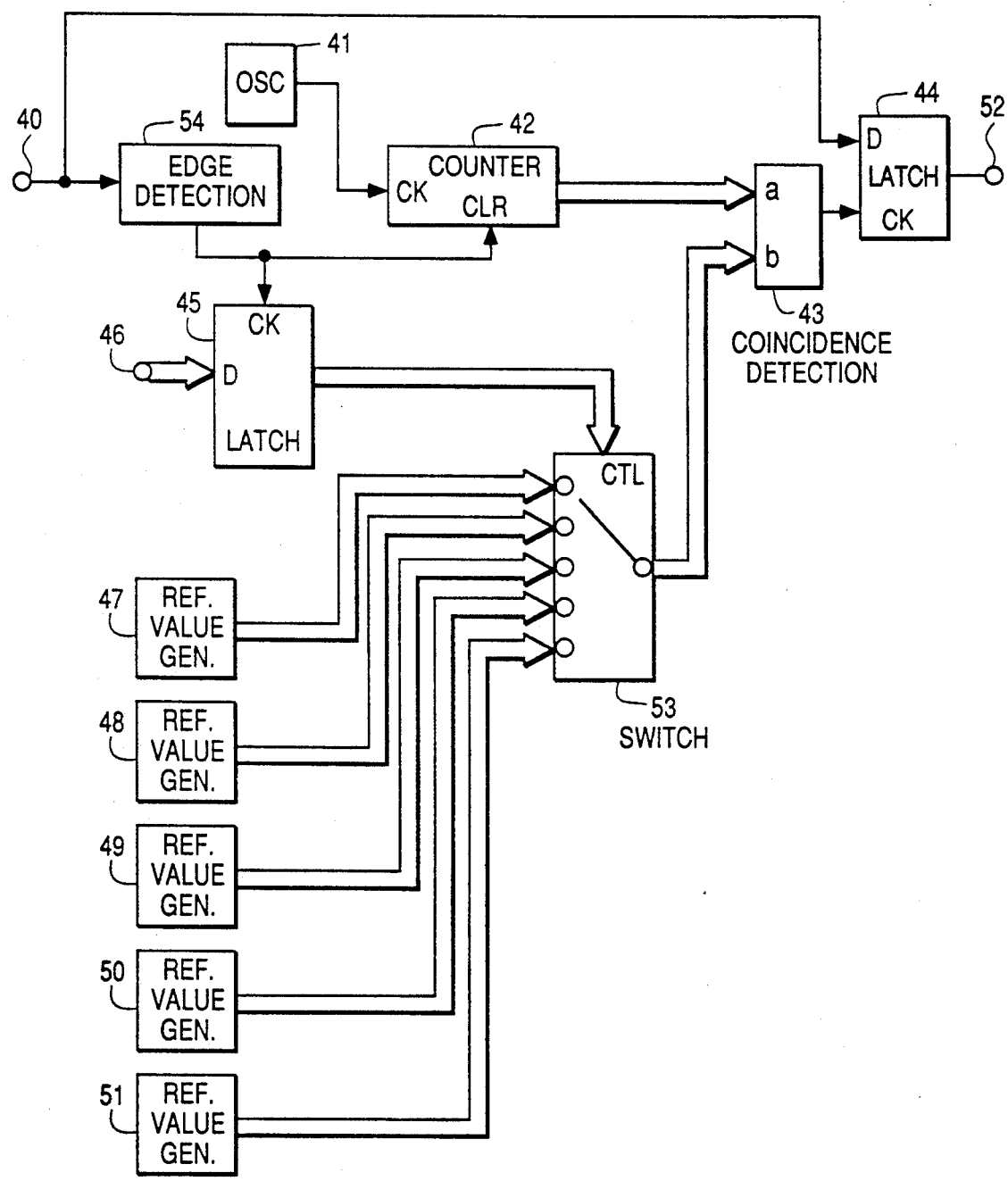
FIG. 3 is a detailed block diagram of a first external-disturbance-component removal circuit.

First, the relationship between FIGS. 1 and 3 is explained. An input terminal 46 is connected to the line 85 shown in FIG. 1. An input terminal 46 is connected to the data bus line 81 shown in FIG. 1. An output terminal 52 is connected to the line 87 shown in FIG. 1.

A binary-coded signal from the input terminal 40 is fed to an edge-detection circuit 54 and a terminal D of a first latch circuit 44. The edge detection circuit 54 detects the rising and falling edges of the received binary-coded signal, and then transmits pulses to a clear terminal CLR of a counter 42 and a clock terminal CK of a second latch circuit 45. A clock terminal CK of the counter 42 receives an output signal from an oscillation circuit 41. By counting pulses from the oscillation circuit 41, the counter 42 measures an interval of pulses received through the terminal CLR, and then outputs the count value to a terminal "a" of a coincidence-detection circuit 43.

When the terminal CK receives pulses, the second latch circuit 45 retains data held at the terminal D at this moment, and then transmits this data to a control terminal CTL of a switch 53. Reference-value generating circuits 47 through 51 respectively transmit predetermined values to the switch 53, which then selects one of those values delivered from the reference-value generating circuits 47 through 51, where the selection of those values is controlled by an output signal from the second latch circuit 45. A terminal "b" of the coincidence detection circuit 43 is connected to the output of the switch 53. Only when the values at the terminals "a" and "b" perfectly coincide with each other, the coincidence detection circuit 43 outputs a HIGH LEVEL signal to a clock terminal CK of the first latch circuit 44, which then detects the rising edge of the signal transmitted to the terminal CK, and then retains the data at its terminal D at this moment and outputs it.

Figure 4:
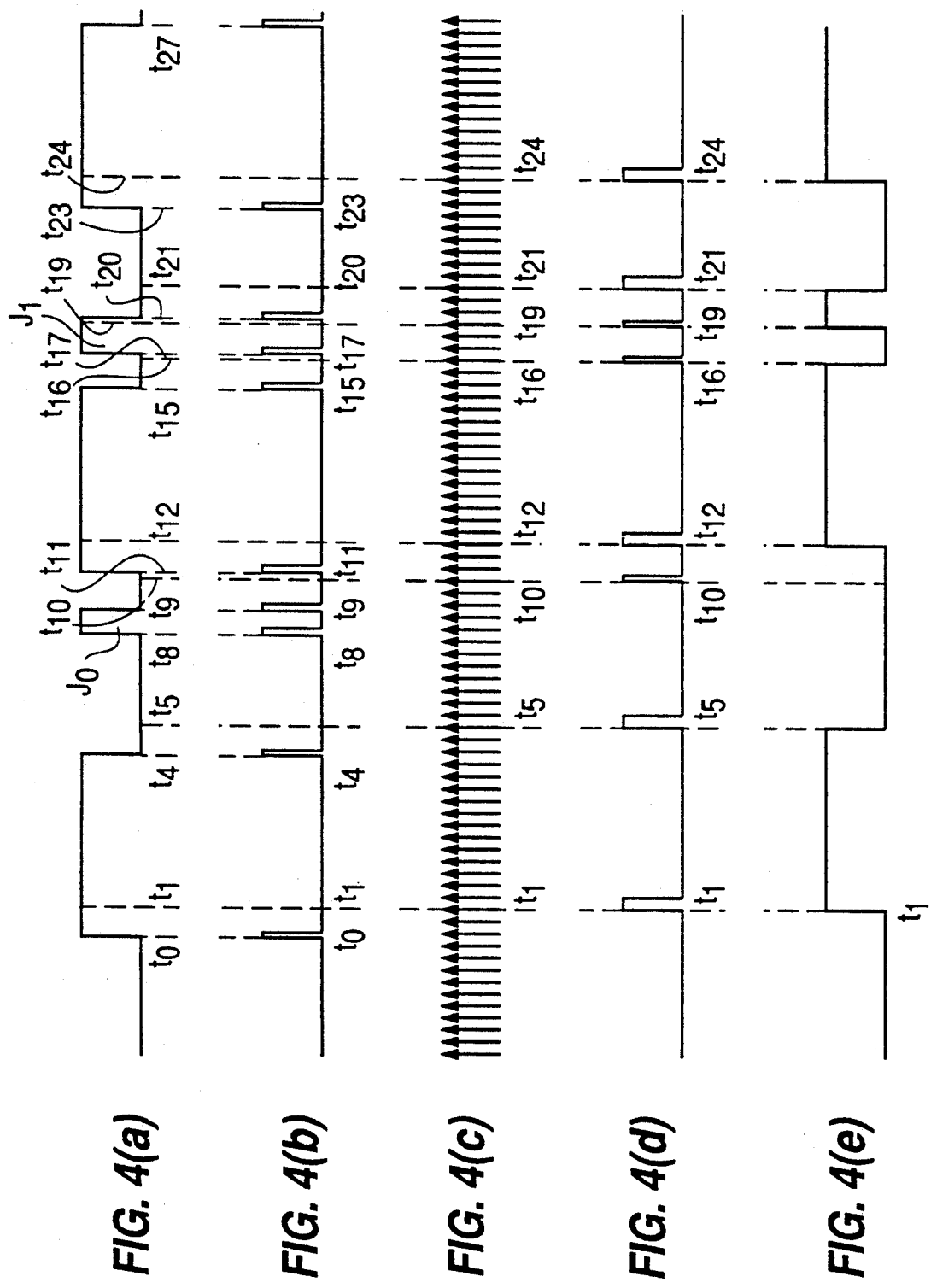
FIGS. 4(a)-(e) constitute a timing chart illustrating operations of the first external-disturbance-component removal circuit.

Next, referring now to the time chart shown in FIG. 4, the operation of the first external-disturbance-component removal circuit 24 is described. FIG. 4 is a time chart depicting the case when the switch 53 selects the value of the reference-value generating circuit 49 having a value '3' for example. FIG. 4(a) designates a waveform outputted from the binary-coding circuit 23 shown in FIG. 1, which is quite similar to the waveform shown in FIG. 2(c). The waveform of FIG. 4(b) designates a waveform of the output signal from the edge-detection circuit 54. The waveform of FIG. 4(c) designates a waveform of pulses outputted from the oscillation circuit 41. The waveform of FIG. 4(d) designates a waveform outputted from the coincidence detection circuit 43. The waveform of FIG. 4(e) designates a waveform of the output signal from the first latch circuit 44.

As is clear from the waveform of FIG. 4(b), the edge-detection circuit 54 outputs pulses in correspondence with the rising and falling edges of input signal, i.e., the waveform of FIG. 4(a). When the pulses shown in the waveform of FIG. 4(b) are transmitted to the terminal CRL of the counter 42, the counter 42 provisionally clears its count value, and then counts clock pulses transmitted to the terminal CK shown in the waveform of FIG. 4(c). The value '3' is preliminarily transmitted to the terminal "b" of the coincidence detection circuit 43. When the value counted by the counter 42 reaches '3', the coincidence detection circuit 43 outputs a coincidence signal as shown in the waveform of FIG. 4(d). As shown in the waveform of FIG. 4(e), in response to the coincidence signal outputted from the coincidence detection circuit 43, the first latch circuit 44 retains the data at the terminal D, and then outputs it. The pulse J0 shown in the waveform of FIG. 4(a) designates an external disturbance component, whose rising and falling edges are generated at the times t8 and t9 of the waveform of FIG. 4(b). However, since only two clock pulses of the waveform of FIG. 4(c) are generated between the times t8 and t9, the coincidence signal is not generated in the waveform of FIG. 4(d). Consequently, the pulse J0 shown in the waveform of FIG. 4(a) is removed, and yet, the pulse J0 is not transmitted to the output terminal 52 as shown in the waveform of FIG. 4(e).

As mentioned earlier, the first external-disturbance-component removal circuit 24 allows passage of a pulse having a HIGH LEVEL or LOW LEVEL period of the binary-coded signal from the binary-coding circuit 23 which is longer than the predetermined time W. However, the first EDCR circuit 24 removes a pulse having a HIGH LEVEL or LOW LEVEL period of the binary-coded signal which is shorter than the predetermined time W. The time W is expressed by the equation shown below.

$$W = n \times TcK$$

where Tck designates the interval of the clocks outputted from the oscillation circuit 41 and "n" denotes the value outputted from switch 53. As a result, when the value of "n" becomes larger, the first EDCR circuit 24 can remove external disturbance components having a broader width. On the other hand, if the time one-half the period of the track-deviation signal from the differential amplifier 18 was shorter than the time W, the track-deviation signal will totally be eliminated by the first EDCR circuit 24.

In response to the signal delivered to the input terminal 46, the switch 53 selects one of the values generated by the reference-value-generating circuits 47 through 51. Assume that the values of these reference-value-generating circuit 47 through 51 are respectively D0, D1, D2, D3 and D4, these values can be entered so that the relationship shown below can be established.

$$D0 < D1 < D2 < D3 < D4$$

Next, the operation of the switch 53 for selecting the values of the reference-value-generating circuits is described below. The selection of the values of the reference-value-generating circuits is controlled based on the data transmitted to the input terminal 46. The output signal from the speed-discriminating circuit 26 is fed the input terminal 46. As is described later, based on the period of the track-deviation signal, the speed-discriminating circuit 26 discriminates the moving speed of the light beam into one of five grades. Of these five grades, on the assumption that the slowest speed region is a first speed region, as the moving speed of the light beam becomes faster, second, third, fourth, and fifth speed regions can be determined. In response to the output signal from the speed-discriminating circuit 26, the switch 53 selects the value D4 when the light beam moves at a speed in the first speed region, or it selects the value D3 when the light beam moves in the second speed region, or it selects the value D2 when the light beam moves in the third speed region, or it selects the value D1 when the light beam moves in the fourth speed region, or it selects the value D0 when the light beam moves in the fifth speed region. These values selected for respective speed regions are determined to be less than one-half the minimum period of the track-deviation signal obtainable when being discriminated into a corresponding speed region.

Figure 5:
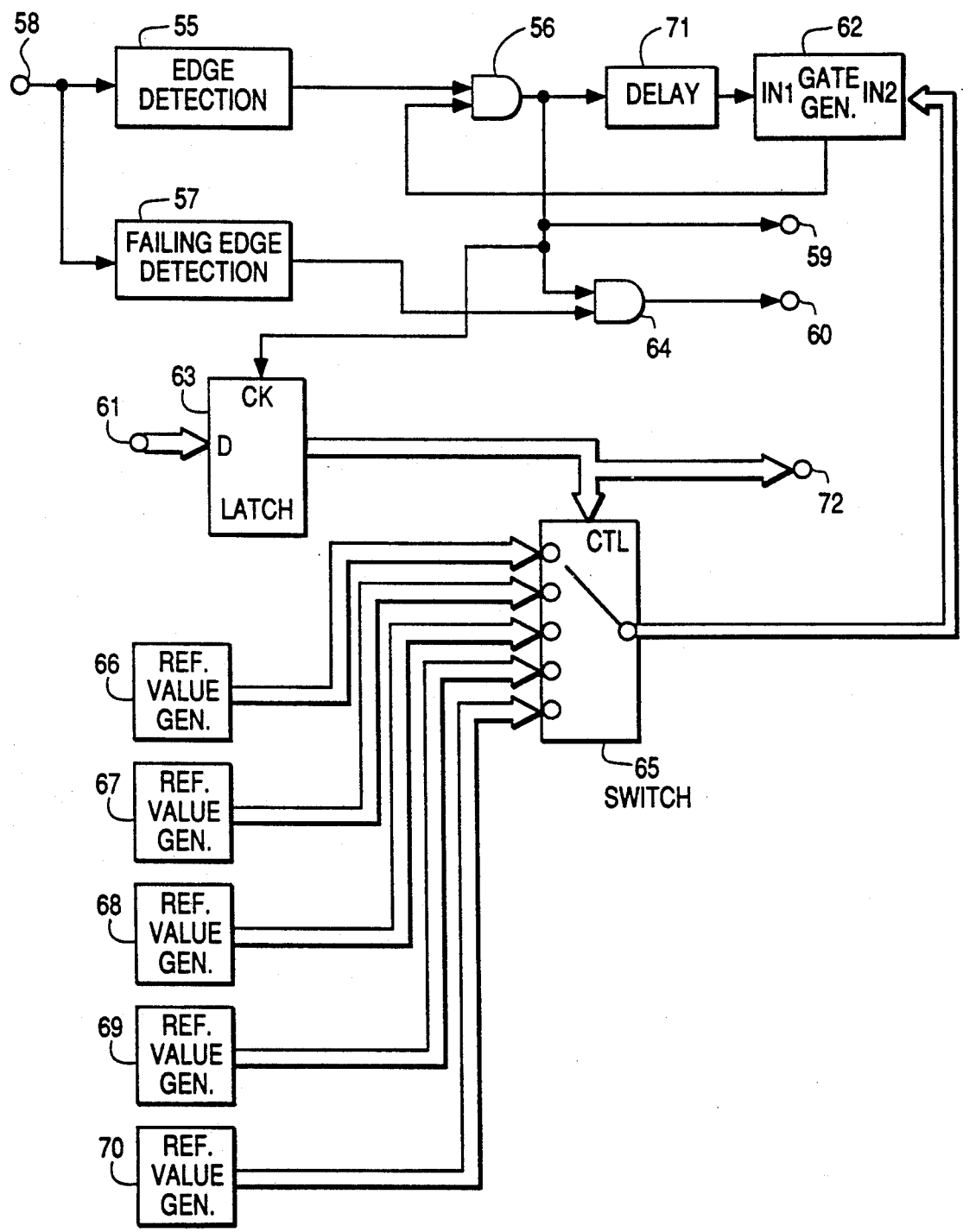
FIG. 5 is a detailed block diagram of a second external-disturbance-component removal circuit.

Next, referring now to FIG. 5, the feature of the second external-disturbance-component removal circuit 27 shown in FIG. 1 is described below. First, the relationship between FIGS. 1 and 5 is explained below.

Input terminals 58 and 61 are respectively connected to the line 86 and the data bus line 82 shown in FIG. 1. Output terminals 59, 60 and 72 are respectively connected to the data line 83, line 84 and the data bus line 81 shown in FIG. 1.

A binary-coded signal received via the input terminal 58 is transmitted to an edge-detection circuit 55 and a falling-edge detection circuit 57. The edge-detection circuit 55 detects the rising and falling edges of the input signal, and then outputs pulses to an AND gate 56. The AND gate 56 receives a signal from a gate-generating circuit 62 via another input terminal thereof. An output signal from the gate-generating circuit 62 initially remains at a HIGH LEVEL. The initial pulse outputted from the edge-detection circuit 55 passes through the AND gate 56 to be transmitted to a delay circuit 71, an AND gate 64, a clock terminal CK of a latch circuit 63 and the output terminal 59. After delaying the input signal, the delay circuit 71 transmits the delayed signal to a terminal IN1 of the gate-generating circuit 62. On receipt of pulses via the terminal CK, the latch circuit 63 retains a data at its terminal D at this moment, and then transmits it to a control terminal CTL of a switch 65 and the output terminal 72.

Reference-value generating circuits 66 through 70 respectively transmit predetermined values to the switch 65. The switch 65 is substantially a circuit which selects any of those values of the reference-value generating circuits 66 through 70. Selection of any of these values is controlled by an output signal from the latch circuit 63.

An output signal from the switch 65 is transmitted to a terminal IN2 of the gate-generating circuit 62. A pulse passed through the AND gate 56 is received by the terminal IN1 via the delay circuit 71, the gate-generating circuit 62 outputs a LOW LEVEL signal for a period corresponding to the value at the terminal IN2. When the output signal from the gate-generating circuit 62 remains low, the AND gate 56 inhibits the edge-detection circuit 55 from outputting a signal. As a result, the pulses appearing at the output terminal of the edge-detection circuit 55 can be outputted only when the output terminal of the gate-generating circuit 62 is a HIGH LEVEL.

The falling-edge detection circuit 57 detects the falling edges of the incoming binary-coded signal and transmits pulses to the AND gate 64. As a result, the signal at the output terminal 60 is a pulse designating a falling edge of the output signal from the AND gate 56.

Next, referring now to the time chart shown in FIG. 6, the operation of the second external-disturbance-component removal circuit 27 is described below.

FIG. 6 presents a time chart in the case where the period in which the output signal from the gate-generating circuit 62 is a LOW LEVEL by the output value from the switch 65 is equal to the time M.

Figure 6A:
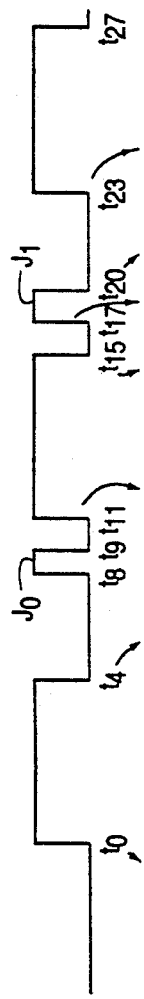
FIG. 6(a)-(g) constitute a timing chart illustrating operation of the second external-disturbance-component removal circuit.

The waveform of FIG. 6(a) designates a waveform outputted from the binary-coding circuit 23 shown in FIG. 1, and is similar to the waveform of FIG. 2(c). Each of the rising edges at the times t0, t11, and t23 of the waveform shown in FIG. 6(a) indicates that the light beam has actually reached the center position between tracks. Each of the falling edges at the times t4, t15 and t27 indicates that the light beam has actually arrived at the center position of a track. Pulses J0 and J1 are respectively generated by external disturbance components. Even if the signal from the binary-coding circuit 23 rises at each of the times t8 and t17, actually, the light beam is not in the center position between tracks. Likewise, even if the output signal from the binary-coding circuit 23 falls at each of the times t9 and t20, the light beam is not in the center position of a track. The waveform shown in FIG. 6(b) designates a waveform outputted from the first external-disturbance-component removal circuit 24 shown in FIG. 1, similar to the waveform shown in FIG. 4(e). The rising edge at each of the times t1, t12 and t24 shown in the waveform of FIG. 6(b) designates that the light beam has arrived at the center position between tracks despite a certain delay. The falling edge at each of the times t5 and t16 designate that the light beam has arrived at the center position of a track despite a certain delay. Pulse J3 is the result of the delayed pulse J1 generated by the external disturbance component. Even if it turns into the rising edge at the time t19, actually, the light beam is not in the center position between tracks. Likewise, even if the pulse J3 turns into the falling edge at the time t21, the light beam is not in the center position of a track. The waveform shown in FIG. 6(c) designates a waveform outputted from the edge-detection circuit 55 shown in FIG. 5. The waveform of FIG. 6(d) designates a waveform outputted from the falling-edge detection circuit 57 shown in FIG. 5. The waveform of FIG. 6(e) designates a waveform outputted from the gate-generating circuit 62 shown in FIG. 5. The waveforms of FIGS. 6(f) and (g) respectively designate waveforms outputted from the AND gates 56 and 64 shown in FIG. 5.

Figure 6B:
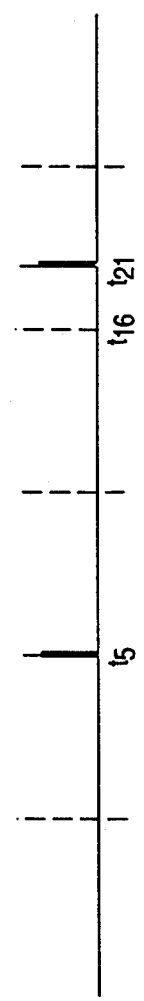
Figure 6C:
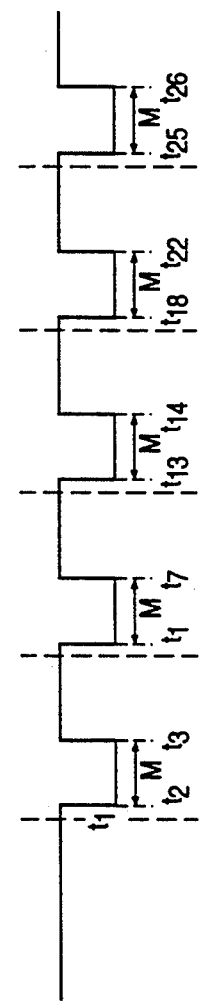

As shown in the waveform of FIG. 6(c), the edge-detection circuit 55 outputs pulses in response to the input signal, in other words, in response to the rising and falling edges of the waveform of FIG. 6(b). Since the gate-generating circuit 62 outputs a HIGH LEVEL signal, those pulses at the times t1, t5, t12, t16 and t24 shown in the waveform of FIG. 6(c) pass through the AND gate 56, so that the AND gate 56 outputs the waveform of FIG. 6(f). The pulse transmitted to the delay circuit 71 is delayed before entering into the terminal IN1 of the gate-generating, circuit 62. As a result, as shown in the waveform of FIG. 6(e), the pulse outputted from the gate-generating circuit 62 remains LOW during the period of the time M ranging from t2 to t3, from t6 to t7, from t13 to t14, from t18 to t22, and from t25 to t26. The pulse J3 shown in the waveform of FIG. 6(b) is the result of external disturbance. As shown in the waveform of FIG. 6(c), pulses are generated at the times t19 and t21. However, since the output signal from the gate-generating circuit 62 remains LOW during the period from t18 to t22, each of such pulses is blocked by the AND gate 56. As a result, as shown in the waveform of FIG. 6(f), pulse J3 shown in the waveform of FIG. 6(b) does not appear at the output of the AND gate 56. Despite being delayed, each of the pulses at the times t1, t12 and t24 of the waveform of FIG. 6(f) designates that the light beam is in the center position between tracks. As a result, the output signal from the output terminal 59 eventually becomes the 0.5-track-moved signal indicating that the light beam has moved across a half track.

Figure 6D:
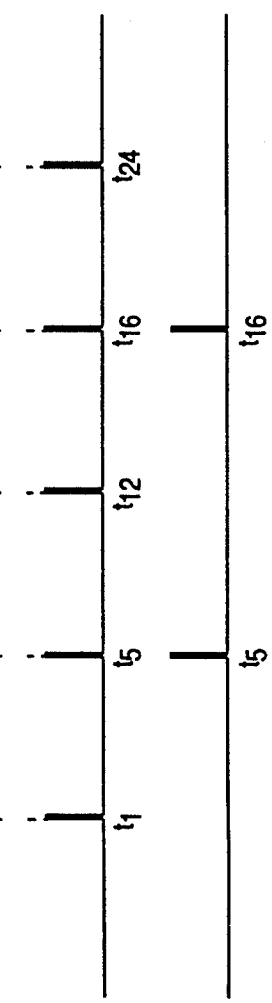
Figure 6E:
Figure 6F:

Next, as shown in the waveform of FIG. 6(d), the falling-edge detection circuit 57 outputs a pulse in correspondence with the input signal, i.e., the falling edge of the waveform of FIG. 6(b).

Figure 6G:

As shown in the waveform of FIG. 6(g), the output signal from the AND gate 64 becomes a waveform having a pulse designating the falling edge extracted from the pulse shown in the waveform of FIG. 6(f). Despite a certain delay, the pulse at each of the times t5 and t16 shown in the waveform of FIG. 6(g) designates that the light beam is in the center position of a track. Consequently, the output signal from the output terminal 60 eventually becomes the track-traversed signal indicating that the light beam has traversed a track.

As mentioned above, the second external-disturbance-component removal circuit 27 removes pulses generated in the time M from a rising edge or a falling edge of the input signal. Accordingly, when the time M is longer, the second external-disturbance-component removal circuit 27 can remove external-disturbance-components in a wider range. On the other hand, if the time one-half the period of the track-deviation signal outputted from the differential amplifier 18 were shorter than the time M, the track-deviation signal will be fully eliminated by the second EDCR circuit 27.

The time M is set by the output signal from the switch 65. In accordance with a signal inputted to the input terminal 61, the switch 65 selects one of those values of the reference-value generating circuits 66 through 70. Assume that the values of the reference-value generating circuits 66 through 70 are respectively E0, E1, E2, E3 and E4, these values can be entered so that the relationship shown below can be established.

$E0 < E1 < E2 < E3 < E4$

Next, the operation of the switch 65 used for selecting the values of the reference-value generating circuits is described below.

The operation for selecting the values of the above reference-value generating circuits is executed in accordance with the data transmitted to the input terminal 61. The output signal from the speed-discriminating circuit 26 is fed to the input terminal 61. If the result of the speed discrimination corresponds to the first speed region, then the value E4 is selected. If the above result corresponds to the second speed region, then the value E3 is selected. If the above result corresponds to the third speed region, then the value E2 is selected. If the above result corresponds to the fourth speed region, then the value E1 is selected. If the above result corresponds to the fifth speed region, then the value E0 is selected. The value selected for each speed region is determined to be less than one-half the minimum period of the track-deviation signal obtainable when being discriminated in the corresponding speed region.

Figure 7:
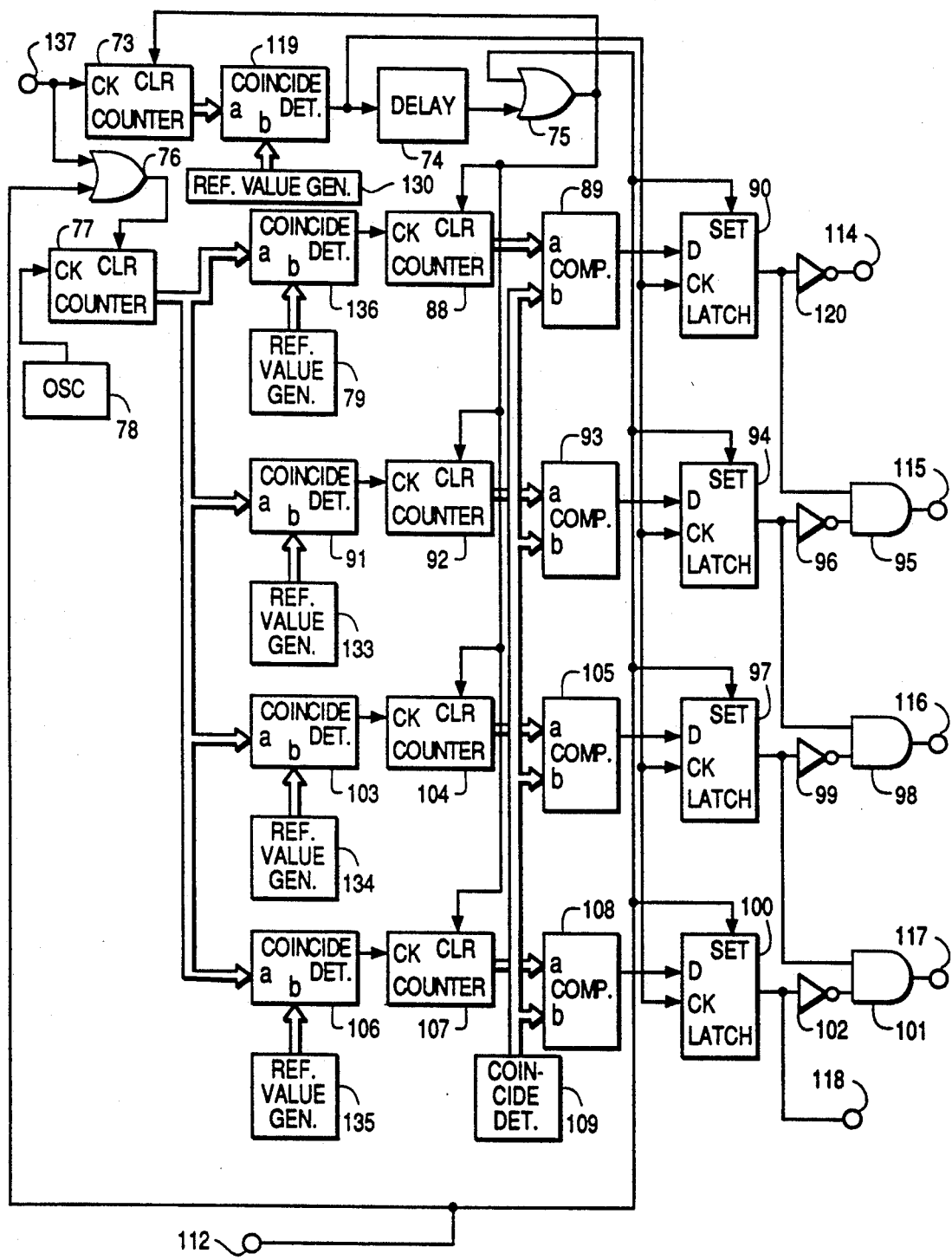
FIG. 7 is a detailed block diagram of a speed-discriminating circuit.

Referring now to FIG. 7, the speed-discriminating circuit 26 is described. First, the relationship between FIGS. 1 and 7 is described. Input terminals 137 and 112 are respectively connected to the line 83 and the data line 36 shown in FIG. 1. A data bus is composed by combining output terminals 114 through 118 which are connected to the data bus line 82 shown in FIG. 1.

The signal transmitted to the input terminal 112 executes control for activating and ceasing the speed-discriminating operation, while the control operation is effective only when this signal remains a LOW LEVEL.

Next, the inoperative condition of the speed-discriminating circuit 26 under a HIGH LEVEL state of the input terminal 112 is described below.

The input terminal 112 transmits the HIGH LEVEL signal to a clear terminal CLR of a counter 77 via an OR gate 76. Simultaneously, the input terminal 112 transmits the HIGH LEVEL signal to clear terminals CLR of counters 88, 92, 104 and 107, via an OR gate 75. As a result, the count values of these counters 77, 88 92, 104 and 107 each remain zero. Furthermore, set terminals SET of latch circuits 90, 94, 97 and 100 turn to a HIGH LEVEL, and as a result, output terminals of these latch circuits 90, 94, 97, and 100 turn to a HIGH LEVEL. Inverters 120, 96, 99 and 102 respectively invert polarities of their input signals. Signals outputted from the latch circuits 90, 94, 97 and 100 are respectively transmitted to the inverters 120, 96, 99 and 102. Each of AND gates 95, 98 and 101 outputs a signal corresponding to a logical AND of its input signals. The AND gate 95 receives signals from the latch circuit 90 and the inverter 96. The AND gate 98 receives signals from the latch circuit 94 and the inverter 99. The AND gate 101 receives signals from the latch circuit 97 and the inverter 102. Consequently, the latch circuits 90, 94, 97 and 100 respectively output HIGH LEVEL signals. As a result, the output terminal 118 remains a HIGH LEVEL. On the other hand, the output terminals 114 through 117 respectively remain a LOW LEVEL.

Next, the process for causing the input terminal 112 to turn from a HIGH LEVEL to a LOW LEVEL to activate the speed-discriminating circuit 26 for discriminating the moving speed of the light beam is described below.

First, the counter 77 counts the number of clock pulses generated from an oscillation circuit 78 and fed to its clock terminal CK. The counter 77 clears the count value as soon as its clear terminal CLR receives a pulse. Since the 0.5-track-moved signal fed to the input terminal 137 is transmitted to the terminal CLR of the counter 77 via the OR gate 76, the counter 77 measures the period of the 0.5-track-moved signal.

Values of the reference-value generating circuits 79, 133, 134 and 135 are entered as F4, F3, F2 and F1 in the relationship F4<F3<F2<F1.

The value counted by the counter 77 is transmitted to terminals "a" of the coincidence-detection circuits 136, 91, 103 and 106. On the other hand, the values of the reference-value generating circuits 79, 133, 134 and 135 are respectively transmitted to terminals "b" of the coincidence-detection circuits 136, 91, 103 and 106, each of which outputs a HIGH LEVEL coincidence signal only when the values at the terminals "a" and "b" precisely coincide with each other.

The coincidence signals outputted from the coincidence-detection circuits 136, 91, 103 and 106 are respectively transmitted to the terminals CK of the counters 88, 92, 104 and 107, each of which counts the coincidence signals delivered to the terminal CK.

Accordingly, the counters 88, 92, 104, and 107, respectively count the number of times in which the value of the counter 77 measuring the period of the 0.5-track-moved signal exceeds the values F4, F3, F2 and F1. Since these values are in the relationship of F4<F3<F2<F1, if the counters 88, 92, 104 and 107 respectively count the values H4, H3, H2 and H1, the relationship of these values becomes H4≧H3≧H2≧H1.

The value of the reference-value generating circuit 109 is determined to be 4. This value is transmitted to terminals "b" of comparison circuits 89, 93, 105 and 108. The values counted by the counters 88, 92, 104 and 107 are respectively transmitted to terminals "a" of the comparison circuits 89, 93, 105 and 108.

When the values of the terminals "a" exceed the values of terminals "b", the comparison circuits 89, 93, 105 and 108 respectively output HIGH LEVEL signals. These comparison circuits respectively check to see if the values counted by the counters 88, 92, 104 and 107 exceed the value 4. For example, based on the relationship H4≧H3≧H2≧H1, if the value of the counter 104 exceeds 4, the values of H4 and H3 also exceed 4. As a result, the comparison circuits 105, 93 and 89 respectively output HIGH LEVEL signals.

The counter 73 counts pulses received by its clock terminal CK. When a HIGH LEVEL signal is transmitted to the clear terminal CLR, the counter 73 clears its count value. The terminal CK of the counter 73 is connected to the input terminal 137, and thus the counter 73 counts the 0.5-track-moved signal.

The value of the reference-value generating circuit 130 is predetermined to be 7, and this value is fed to a terminal "b" of a coincidence-detection circuit 119. When the counter 73 counts up the value 7, the coincidence-detection circuit 119 transmits a HIGH LEVEL coincidence signal to the terminals CK of the latch circuits 90, 94, 97 and 100 and the delay circuit 74.

The output signals from the comparison circuits 89, 93, 105 and 108 are respectively transmitted to the terminals D of the latch circuits 90, 94, 97 and 100. On receipt of the coincidence signal from the coincidence-detection circuit 119, the latch circuits 90, 94, 97 and 100 respectively retain the data at the terminals D and output them.

The delay circuit 74 delays the output signal of the coincidence detection circuit 119 by a certain period of time which is sufficient to allow the latch circuits 90, 94 and 100 to complete the data-retention, and then transmits the delayed signal to the terminals CLR of the counters 73, 88, 92, 104 and 107 via the OR gate 75. As a result, after completing the data retention by means of the latch circuits 90, 94, 97 and 100, the values counted by the counters 73, 88, 92, 104 and 107 are respectively reset, thus allowing the speed-discriminating circuit 26 to reactivate the speed-discriminating operation.

As mentioned above, the speed-discriminating circuit 26 sequentially measures the times each spent for the movement of the light beam across a half track to obtain seven continuously counted values. Finally, based on these counted values, the speed-discriminating circuit 26 discriminates the moving speed of the light beam. Assume that the period of clock pulses generated from the oscillation circuit 78 is Ta, reference times T1, T2, T3 and T4 are calculated by equations shown below.

$$T1 = F1 \times Ta$$

$$T2 = F2 \times Ta$$

$$T3 = F3 \times Ta$$

$$T4 = F4 \times Ta$$

The speed-discriminating circuit 26 compares each of the seven counted values with each of the above reference times T1 through T4. If 4 or more of the counted values exceed T1, then, all of the latch circuits 90, 94, 97 and 100 output HIGH LEVEL signals. As a result, only the output terminal 118 goes HIGH, thus allowing the speed-discriminating circuit 26 to determine it to be the first speed region. If there were less than 4 of the counted values exceeding T1 and more than 3 of the counted values exceeding T2, the output of the latch circuit 100 turns to a LOW LEVEL, whereas all the outputs of the latch circuits 90, 94 and 97 respectively turn to a HIGH LEVEL, and as a result, only the terminal 117 goes HIGH, thus allowing the speed-discriminating circuit 26 to determine this condition to be the second speed region. If there were less than 4 of the counted values exceeding T2 and more than 3 of the counted values exceeding T3, the outputs of the latch circuits 97 and 100 turn to a LOW LEVEL, whereas the outputs of the latch circuits 90 and 94 respectively turn to a HIGH LEVEL. As a result, only the output terminal 116 goes HIGH, thus allowing the speed-discriminating circuit 26 to determine this condition to be the third speed region. If there were less than 4 of the counted values exceeding T4, all the outputs of the latch circuits 94, 97 and 100 turn to a LOW LEVEL. As a result, only the output of the latch circuit 90 goes HIGH. This causes the output terminal 115 to a turn to HIGH LEVEL, thus allowing the speed-discriminating circuit 26 to determine this condition to be the fourth speed region. If there were less than 4 of the counted values exceeding T4, all the outputs of the latch circuits 90, 94, 97 and 100 turn to a LOW LEVEL, and as a result, only the output terminal 114 goes HIGH, thus allowing the speed-discriminating circuit 26 to determine this condition to be the fifth speed region.

Figure 8:
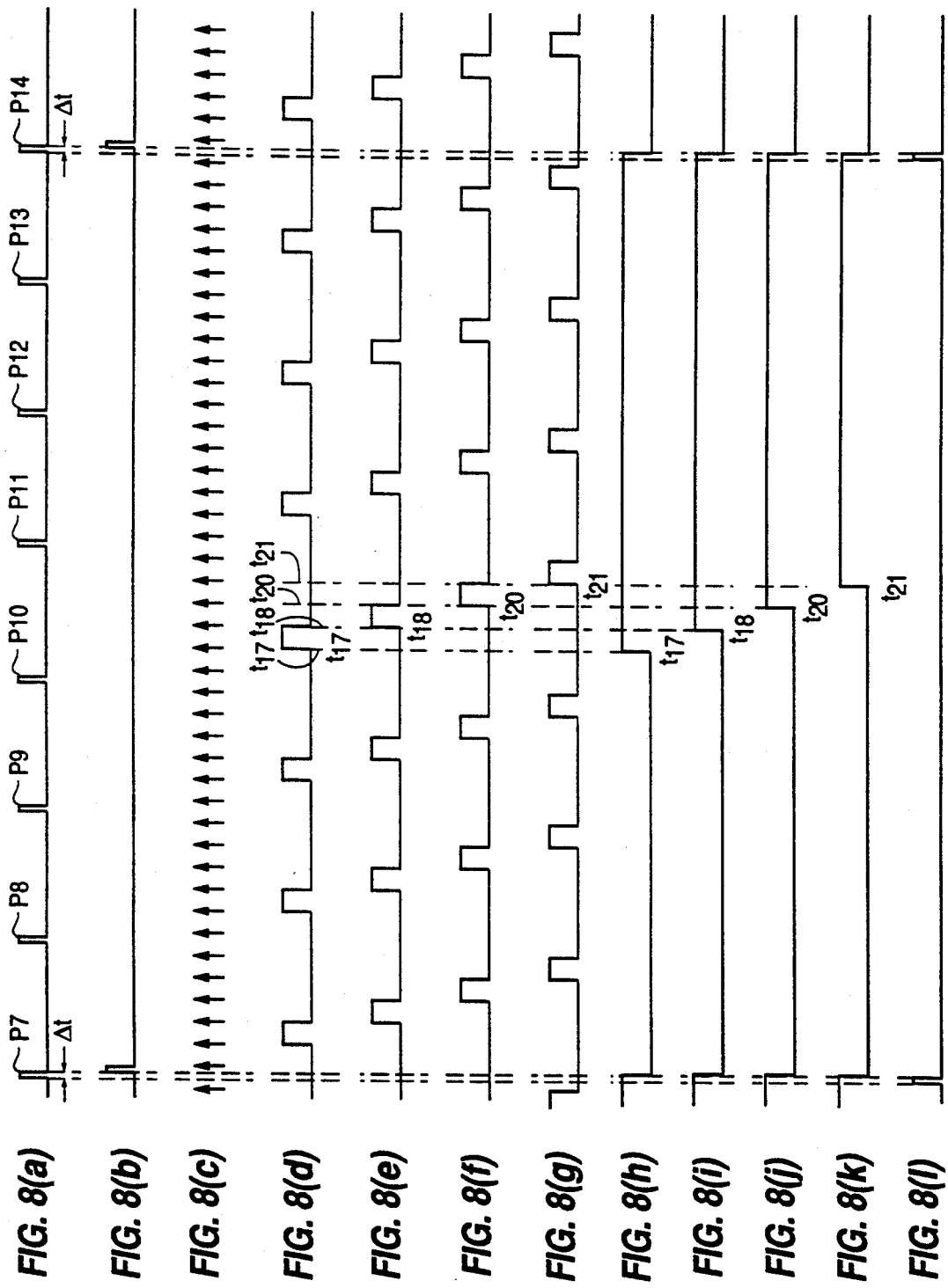
FIGS. 8(a)-(l) and 9(a)-(l) are timing charts illustrating operations of the speed-discriminating circuit.

Referring now to the time chart shown in FIG. 8, the operation of the speed-discriminating circuit 26 shown in FIG. 7 is described. FIG. 8 represents a timing chart showing a condition in which values F4, F3, F2 and F1 of the reference-value generating circuits 79, 133, 134 and 135, are respectively assumed to be 2, 3, 4 and 5 and the value counted by the counter 73 to be 6.

The waveform of FIG. 8(a) designates the 0.5-track-moved signal outputted from the second external-disturbance-component removal circuit 27 shown in FIG. 1. The waveform of FIG. 8(b) designates a waveform, outputted from the delay circuit 74. The waveform of FIG. 8(c) designates a waveform outputted from the oscillation circuit 78. The waveforms of FIGS. 8(d) through (g) are respectively those waveforms outputted from the coincidence-detection circuits 136, 91, 103 and 106. The waveforms of FIGS. 8(h) through (k) respectively designate those waveforms outputted from the comparison circuits 89, 93, 105 and 108. The waveform of FIG. 8(l) designates a waveform outputted from the coincidence-detection circuit 119.

When the input terminal 137 receives a pulse P7 shown in the waveform of FIG. 8(a), the counter 73 counts the value 7. As a result, as shown in the waveform of FIG. 8(l), the output signal from the coincidence-detection circuit 119 goes HIGH. As shown in the waveform of FIG. 8(b), after a certain time Δt is past, the output signal from the delay circuit 74 goes HIGH, and simultaneously, as shown in the waveform of FIG. 8(l), the output signal from the coincidence-detection circuit 119 goes LOW. As a result, since the values counted by the counters 88, 92, 104 and 107 are cleared by the output signal from the delay circuit 74, as shown in the waveforms of FIGS. 8(h) through (k), the output signals from the comparison circuits 89, 93, 105 and 108 respectively turn to a LOW LEVEL.

Whenever, each of pulses P7 through P14 shown in the waveform of FIG. 8(a) is delivered to the input terminal 137, the counter 77 clears the count value, and then counts pulse signals shown in the waveform of FIG. 8(c) generated by the oscillation circuit 78. When the counter 77 counts up the value 2, as shown in the waveform of FIG. 8(d), the output signal from the coincidence-detection circuit 136 goes HIGH. Likewise, when the counter 77 counts up the values 3, 4, and 5, as shown in the waveforms of FIGS. 8(e) through (g), the output signals from the coincidence-detection circuits 91, 103 and 106 respectively turn to a HIGH LEVEL.

The counter 88 counts the rising edges of the output signal from the coincidence-detection circuit 136 shown in the waveform of FIG. 8(d), where the counted value becomes 4 at the rising edge corresponding to the time t17. When the counter 88 counts up the value 4, as shown in the waveform of FIG. 8(h), the output signal from the comparison circuit 89 goes HIGH at the time t17.

The counter 92 counts the rising edges of the output signal from the coincidence-detection circuit 91 shown in the waveform of FIG. 8(e), where the counted value becomes 4 at the rising edge corresponding to the time t18. When the counter 92 counts up the value 4, as shown in the waveform of FIG. 8(i), the output signal from the comparison circuit 93 goes HIGH at the time t18.

The counter 104 counts the rising edges of the output signal from the coincidence-detection circuit 103 shown in the waveform of FIG. 8(f), where the counter value becomes 4 at the rising edge corresponding to the time t20. When the counter 104 counts up the value 4, as shown in the waveform of FIG. 8(j), the output signal from the comparison circuit 105 goes HIGH at the time t20.

The counter 107 counts the rising edges of the output signal from the coincidence-detection circuit 106 shown in the waveform of FIG. 8(g), where the counted value becomes 4 at the rising edge corresponding to the time t21. When the counter 107 counts up the value 4, the output signal from the comparison circuit 108 goes HIGH at the time t21 as shown in the waveform of FIG. 8(k).

When a pulse P14 shown in the waveform of FIG. 8(a) is transmitted to the input terminal 137, the counter 73 counts up the value 7, and then, as shown in the waveform of FIG. 8(l), the output signal from the coincidence-detection circuit 119 goes HIGH. Accordingly, the latch circuits 90, 94, 97 and 100 respectively retain HIGH LEVEL signals at their terminals D.

As shown in the waveform of FIG. 8(b), after a certain time Δt is past, the output signal from the delay circuit 74 goes HIGH, and as a result, values counted by the counters 88, 92, 104 and 107 are cleared. Accordingly, as shown in the waveforms of FIGS. 8(h) through (k), all the signals outputted from the comparison circuits 89, 93, 105 and 108 turn to a LOW LEVEL.

In FIG. 8, all the signals outputted from the latch circuits 90, 94, 97 and 100 turn to a HIGH LEVEL, and as a result, the output terminal 118 turns to a HIGH LEVEL, whereas the output terminals 114 through 117 respectively turn to a LOW LEVEL, thus allowing the speed-discriminating circuit 26 to identify that the speed of the light beam moving across the record carrier 1 falls in the first speed region.

As the interval of pulses of the input waveform of FIG. 8(a) becomes shorter, the moving speed of the light beam is discriminated into the second, third, fourth, and fifth speed regions.

There is a certain limit in the capability of the first and second external-disturbance-component removal circuits 24 and 27 for eliminating external disturbance components. Unremovable external disturbance components may occasionally enter into the speed-discriminating circuit 26. Referring now to the time chart shown in FIG. 9, the operation of the speed-discriminating circuit 26 shown in FIG. 7 is described below on the assumption that an unremovable disturbance occurs.

Figure 9:
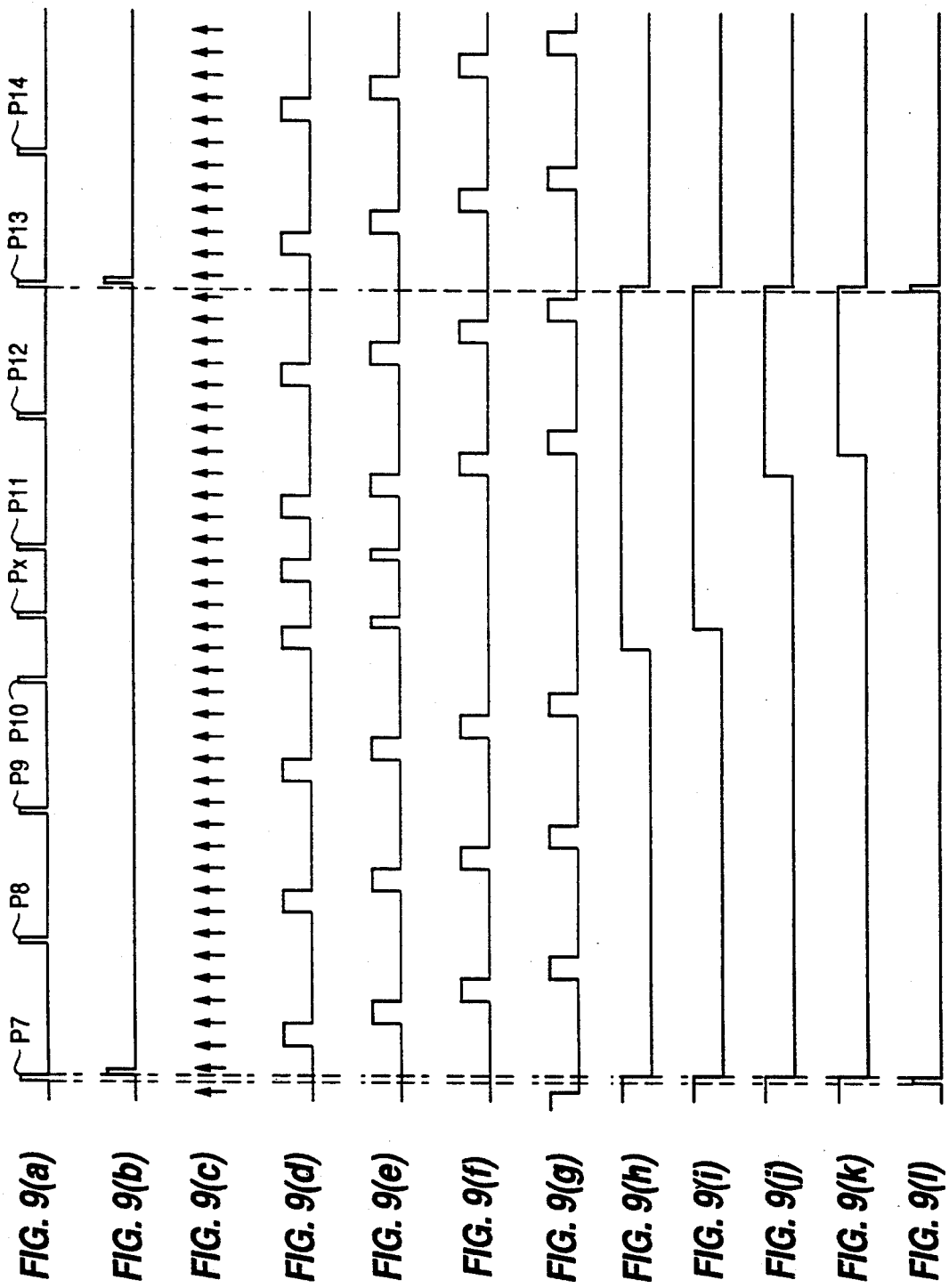

Like FIG. 8, FIG. 9 also presents a time chart based on the condition in which the values of the reference-value generating circuits 79, 133, 134 and 135 are respectively assumed to be 2, 3, 4 and 5 and the counter 73 counts up the value 6. The waveforms of FIG. 9(a) through (l) shown in FIG. 9 respectively correspond to the waveforms of FIGS. 8(a) through (l).

Pulse Px shown in the waveform of FIG. 9(a) designates the external disturbance component unremovable by the first and second EDCR circuits 24 and 27. Since a pulse Px is generated between pulses P10 and P11 by occurrence of the external disturbance, the period between pulses becomes shorter. As a result, the counter 77 merely counts the small value 3. Consequently, since this value is less than the proper values 4 and 5 of the reference-value generating circuits 134 and 135, the coincidence-detection circuits 103 and 106 cannot output the coincidence signals, and as a result, as shown in the waveforms of FIGS. 9(j) and (k), a certain delay occurs in the time for causing the comparison circuits 105 and 108 to turn to a HIGH LEVEL. However, since a pulse P13 shown in the waveform of FIG. 9(a) is delivered to the input terminal 137 and the output signals from the comparison circuit 105 and 108 turn to a HIGH LEVEL at the moment at which the value counted by the counter 73 reaches 7, like the case shown in FIG. 8, the speed-discriminating circuit 26 identifies that the above case falls in the first speed region. As mentioned above, even if the external disturbance pulse Px were delivered to the input terminal 137, the speed-discriminating circuit 26 sequentially counts the time spent for the movement of the light beam across a half track by seven consecutive times in order to determine the time by checking to see if more than 3 of the seven counted values exceed the reference time. As a result, no error can be generated in discriminating the moving speed of the light beam across a half track.

Likewise, for any reason, even if the pulse P10 shown in the waveform of FIG. 9(a) was overlooked, the speed-discriminating circuit 26 never commits an error in discriminating the moving speed of the light beam.

Figure 10:
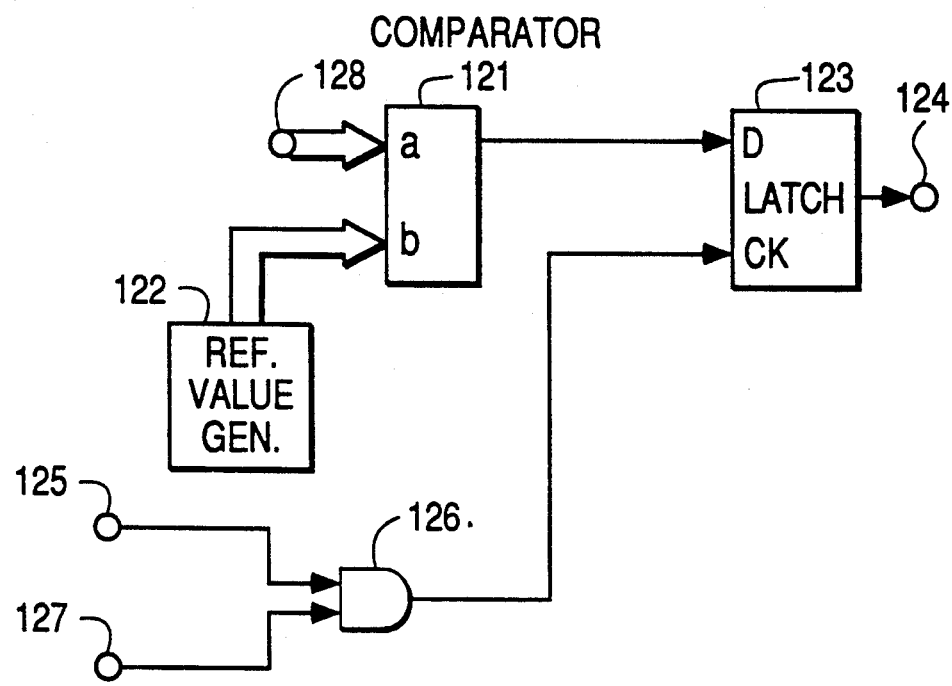
FIG. 10 is a detailed block diagram of a track-interval detection circuit.

Next, referring now to FIG. 10 the feature of the track-interval detection circuit 28 is described below. First, the relationship between FIGS. 1 and 10 is explained. Input terminals 128, 125 and 127 are respectively connected to the data bus line 38, line 87, and line 83 shown in FIG. 1. An output terminal 124 is connected to the data line 80 shown in FIG. 1.

The output value of the reference-value generating circuit 122 is determined to be 1. This value is transmitted to a terminal "b" of a comparison circuit 121. A terminal "a" of the comparison circuit 121 is connected to the input terminal 128 and receives the data of the number of tracks up to the objective track from the counter circuit 35 shown in FIG. 1. When the values at the terminals "a" and "b" are equal to each other, the output signal from the comparison circuit 121 goes HIGH. The output signal from the comparison circuit 121 is transmitted to a terminal D of a latch circuit 123.

An AND gate 126 introduces a logical AND of the 0.5-track-moved signal from the input terminal 127 and the output signal from the first EDCR circuit 24 delivered via the input terminal 125, and then transmits the AND result to a clock terminal CK of the latch circuit 123. On receipt of a rising edge at the terminal CK, the latch circuit 123 retains the data at the terminal D and outputs it.

Referring now to the time chart shown in FIG. 11, the operation of the track-interval detection circuit 28 shown in FIG. 10 is described below. The waveform (a) designates a waveform of FIG. 11 outputted from the binary-coding circuit 23 shown in FIG. 1, which indicates that the light beam first arrives at the track just before the objective track at the falling edge corresponding to the time t2 before eventually arriving at the objective track at the falling edge corresponding to the time t6. The waveform of FIG. 11(b) designates a waveform outputted from the first EDCR circuit 24, indicating that the waveform of FIG. 11(a) delays by the time W. The waveform of FIG. 11(c) designates the 0.5-track-moved signal outputted from the second EDCR circuit 27. The waveform of FIG. 11(d) designates a waveform outputted from the comparison circuit 121. The waveform of FIG. 11(e) designates a waveform outputted from the AND gate 126. The waveform (f) designates a waveform outputted from the latch circuit 123. The waveform (g) designates a waveform outputted from the switch 25 shown in FIG. 1.

Figure 11A:
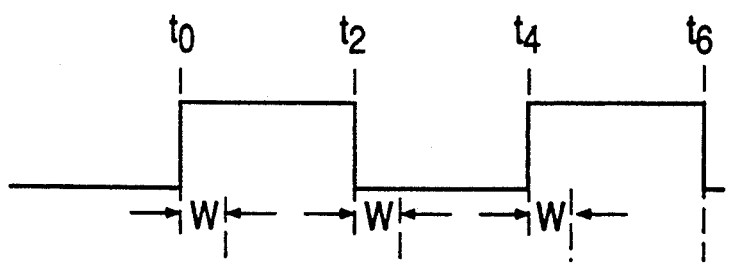
FIGS. 11(a)-(g) constitute a timing chart illustrating operations of the track-interval detection circuit.
Figure 11B:
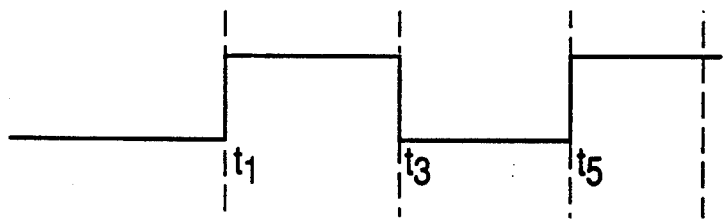
Figure 11C:
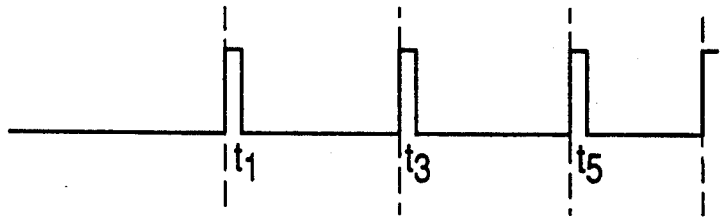
Figure 11D:
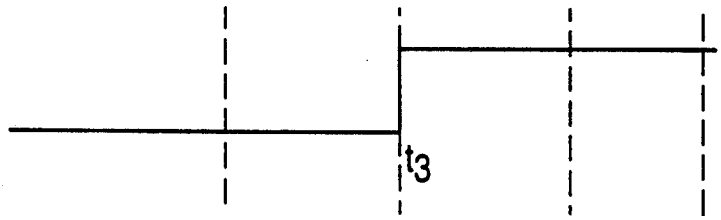

Since the falling edge at the time t2 shown in the waveform of FIG. 11(a) designates the track just before the objective track, the value to be transmitted to the input terminal 128 becomes 1 at the time t3 of the waveform of FIG. 11(b), which is to be delivered to a input terminal 125. As a result, as shown in the waveform of FIG. 11(b), the output signal from the comparison circuit 121 turns to HIGH LEVEL at the time t3.

Figure 11E:
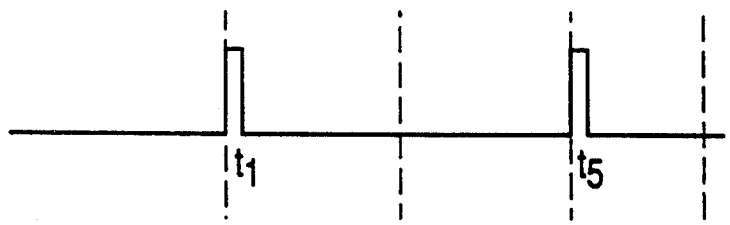
Figure 11F:
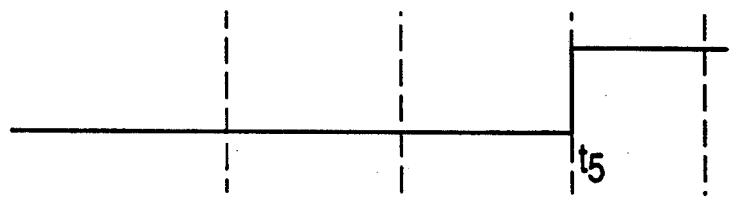
Figure 11G:
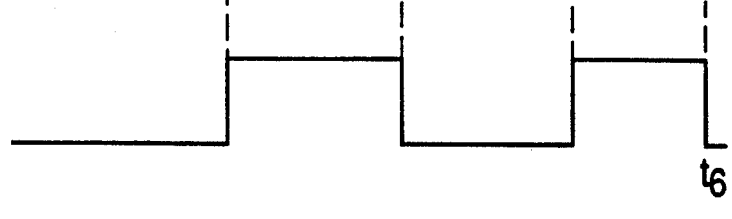

The output signal from the AND gate 126 becomes the waveform of FIG. 11(e) as a result of the AND of the waveforms of FIGS. 11(b) and (c). As shown in the waveform of FIG. 11(f), the latch circuit 123 goes HIGH at the time t5. The terminal "r" of the switch 25 shown in FIG. 1 is switched to the terminal "s", and as a result, the output signal from the switch 25 becomes the waveform of FIG. 11(g). In other words, since the output signal from the binary-coding circuit 23 is directly transmitted to the second EDCR circuit 27, the value counted by the counting circuit 35 becomes zero at the time position t6. Therefore, the objective track can be detected without delay. Since the tracking control is performed at the time t6, positioning of the light beam on the objective track can be executed very stably.

Next, referring now to FIG. 12, a problem arising from the simultaneous switchings of the time W of the first EDCR circuit 24 and the time M of the second EDCR circuit 27 is explained below.

FIG. 12 is a time chart depicting the case when the speed-discriminating circuit 26 identifies that the moving speed of the light beam has shifted at the time t2 from the first speed region to the second speed region. Assume that the time W is w1 and the time M is m1 in the first speed region, and the time W is w2 and the time M is m2 in the second speed region, then the relationship of these is expressed as follows.

$$m1 > m2, w1 > w2$$

Figure 12A:
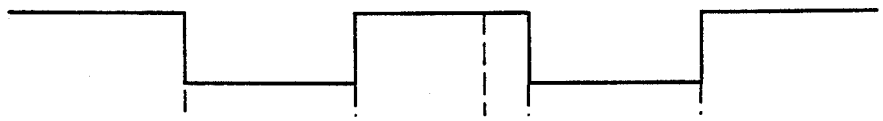
FIGS. 12(a)-(c) and 13(a)-(c) are timing charts illustrating operations for changing the characteristic of the external-disturbance-component removal circuit.

The waveform of FIG. 12(a) designates a waveform to be transmitted to the first EDCR circuit 24. The waveform of FIG. 12(b) designates a waveform outputted from the first EDCR circuit 24. The waveform of FIG. 12(c) designates a waveform outputted from the gate-generating circuit 62 shown in FIG. 5.

Figure 12B:
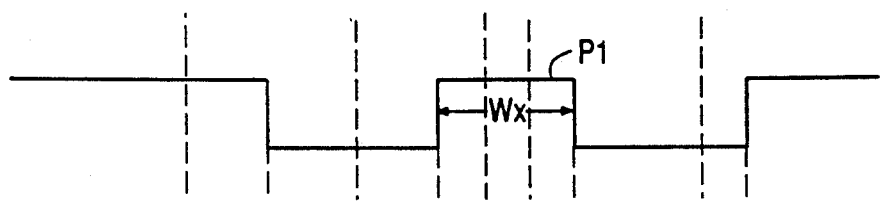
Figure 12C:
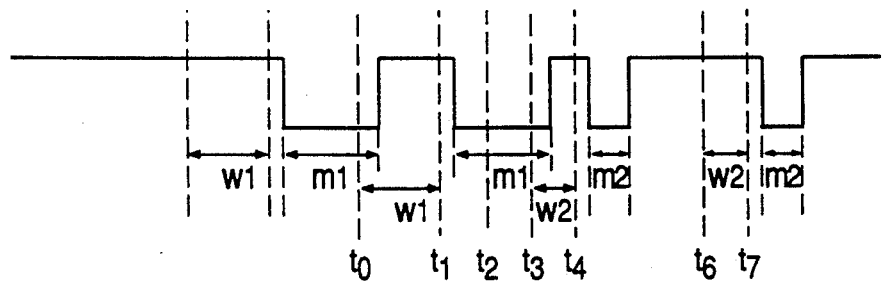

Prior to the time t2, the delay time in the first EDCR circuit 24 becomes w1, whereas the delay time after the time t2 becomes w2. As a result, compared to the duration of a HIGH LEVEL during the t0 through t3 period of the input waveform of FIG. 12(a), the duration of a HIGH LEVEL during the t1 through t4 period of the waveform of FIG. 12(b) is shorter by the difference (w1−w2) of the delay times.

On the other hand, the time M of the second EDCR circuit 27 becomes m1 before the time t2 and m2 after the time t2. Consequently, the time M of the second EDCR circuit 27 for the rising edge at the time t1 shown in the waveform of FIG. 12(b) is m1. In order to prevent the pulse P1 from being removed by the second EDCR circuit 27, the value of m1 should be set smaller than the value of the time W. Nevertheless, if the value of m1 were too small, the capability of the second EDCR circuit 27 for removing external disturbance components would be degraded.

To prevent the second EDCR circuit 27 from lowering its capability for removing external disturbance components, the apparatus embodied by the invention changes the time W of the first EDCR circuit 24 after changing the time M of the second EDCR circuit 27. Referring now to FIG. 13, this arrangement is described below.

Like FIG. 12, FIG. 13 presents a time chart of the case when the speed-discriminating circuit 26 identifies that the moving speed of the light beam has shifted at the time t2 from the first speed region to the second speed region.

As mentioned above, the time M of the second EDCR circuit 27 is switched at a rising or falling edge of the signal inputted to the second EDCR circuit 27 after the speed-discriminating circuit 26 has identified the second speed region at the time t2, and thus, the time M becomes m2 after the time t5 shown in the waveform of FIG. 13.

The time W of the first EDCR circuit 24 is switched at a rising or falling edge of the signal inputted to the first EDCR circuit 24 subsequent to the switching of the time M of the second EDCR circuit 27. As a result, the time W becomes w2 after the time t6, thus allowing the signal shown in the waveform of FIG. 13(b) to be outputted.

Figure 13A:
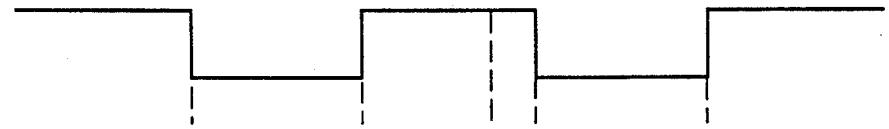
Figure 13B:
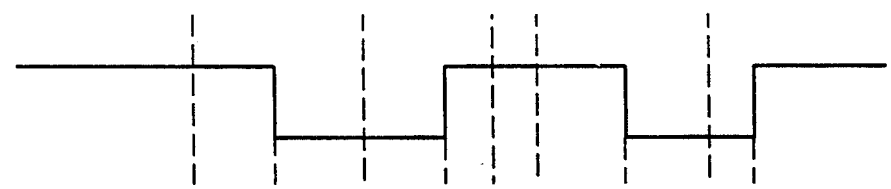
Figure 13C:
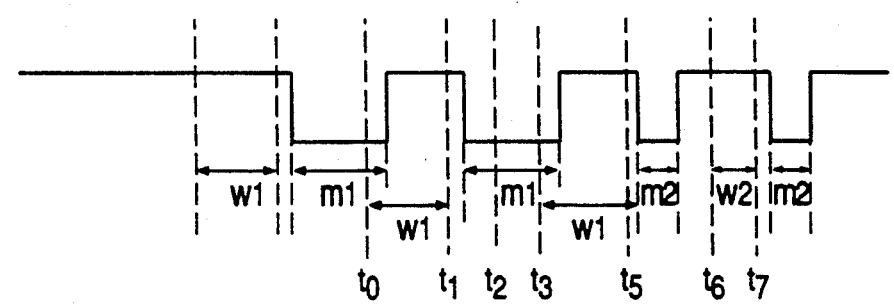

As shown in the waveform of FIG. 13(b), compared to the LOW LEVEL period during the t3 through t6 period of the waveform of FIG. 13(a), the LOW LEVEL period during the t5 through t7 period becomes shorter by the time (w1-w2) which is the difference of the delay times. However, since the time M of the second EDCR circuit 27 for the edge at the time t5 shown in the waveform of FIG. 13(b) has already been changed to the time m2, compared to the simultaneous switchings of times explained in reference to FIG. 12, the time value m1 can be set larger. Accordingly, the capability of the second EDCR circuit for removing external disturbance components can be improved by switching the time W of the first EDCR circuit 24 after completing the switching of the time M of the second EDCR circuit 27.

The invention has thus been described in detail. It should be understood however that the spirit and scope of the invention is not limited to those embodiments described above.

For example, it is possible to change the values F4, F3, F2 and F1 of the reference-value generating circuits 79, 133, 134 and 135 of the speed-discriminating circuit 26 in a range satisfying the relationship F1>F2>F3>F4 and optionally provide the speed range in which the speed-discriminating circuit 26 can discriminate the first through fifth speed regions. The above embodiment provides the speed-discriminating circuit 26 which discriminates the speed regions into five grades. However, the number of the grade may optionally be provided. It is also possible to configure the speed-discriminating circuit 26 so that it can discriminate the moving speed of the light beam based on the movement of the light beam across a full track instead of using the 0.5-track-moved signal.

What is claimed is:

1. A data-track accessing apparatus comprising:
    conversion means for reproducing a signal from a record carrier which has a plurality of tracks;
    track-deviation detection means for detecting a deviation of a reproduction position of said conversion means on said record carrier from a position of a track;
    transfer means for transferring the reproduction position of said conversion means on said record carrier in a direction traversing said tracks on said record carrier;
    binary-coding means for converting an output signal from said track-deviation detection means into a binary-coded signal;
    signal processing means for removing an external disturbance component from said binary-coded signal;
    speed-discriminating means for detecting that a moving speed of the reproduction position relative to the tracks reaches a predetermined speed from an output signal of said signal processing means and including means responsive to the moving speed detection result for switching a characteristic for removing the external disturbance component of said signal processing means; and
    control means for controlling said transfer means based on the output signal of said signal processing means to detect an objective track.

2. An apparatus as set forth in claim 1, wherein said speed-discriminating means comprises means for measuring a time needed for the reproduction position to traverse a track based on the output signal of said signal processing means, and means for comparing the measured time with a predetermined reference value and judging that the moving speed reaches the predetermined speed when the measured time becomes equal to the predetermined reference value.

3. An apparatus as set forth in claim 1, wherein said speed-discriminating means comprises means for measuring times each needed for the reproduction position to traverse a track based on the output signal of said signal processing means, and means for comparing each of the measured times with a predetermined reference value and judging that the moving speed reaches the predetermined speed when the number of the measured times each being larger than the reference value more than a predetermined number.

4. An apparatus as set forth in claim 1, wherein said speed-discriminating means discriminates the moving speed of the reproduction position into one of a plurality of predetermined speed ranges.

5. An apparatus as set forth in claim 1, wherein said speed-discriminating means includes means for measuring a time needed for the reproduction position to traverse a half track pitch.

6. An apparatus as set forth in claim 1, wherein said signal processing means comprises means for measuring a duration of each pulse contained in an output signal from said binary-coding means, and means for removing a pulse having a duration shorter than a predetermined time W, the value of said time W being varied by said speed-discriminating means.

7. An apparatus as set forth in claim 1, wherein said signal processing means comprises means for removing from an output signal of said binary-coding means a pulse occurring within a predetermined time M from a level transition point of the output signal of said binary-coding means, the value of said time M being varied by said speed-discriminating means.

8. An apparatus as set forth in claim 1, wherein said signal processing means comprises first means for removing from said binary-coded signal a pulse having a duration shorter than a predetermined time W, second means for removing from said binary-coded signal a pulse occurring within a predetermined time M from a level transition point of said binary-coded signal, and third means for changing values of the time W and M based on a result of discrimination executed by said speed-discriminating means.

9. An apparatus as set forth in claim 8, wherein said signal processing means feeds an output signal from said binary-coding means to said first means and an output signal from said first means to said second means, and outputs an output signal from said second means.

10. An apparatus as set forth in claim 9, wherein said third means changes the value of the time M before changing the value of the time W.

11. A data-track accessing apparatus comprising:
    conversion means for reproducing a signal from a record carrier which has a plurality of tracks;
    track-deviation detecting means for detecting a variation of a data-reproduction position of said conversion means on said record carrier from a track position;
    transfer means for transferring the data-reproduction position of said conversion means on said record carrier in a direction traversing the tracks on said record carrier;

binary-coding means for converting an output signal from said track-deviation detecting means into a binary-coded signal;

signal processing means for performing an operation for removing an external disturbance component from the binary-coded signal of said binary-coding means;

control means for controlling said transfer means to detect an objective track based selectively on one of an output signal from said signal processing means and the binary-coded signal of said binary coding means; and position detecting means for detecting when the data-reproduction position of said conversion means on the record carrier is in close proximity to and prior to the objective track based on the output signal from said signal processing means while said control means controls said transfer means to transfer the data-reproduction position of said conversion means towards the objective track based on the output signal from said signal processing means; and, switch means for causing said control means to control said transfer means based on the binary-coded signal of said binary-coding means to detect the objective track when said position detecting means detects that the data-reproduction position of said conversion means on the record carrier is in close proximity to and prior to the objective track.

* * * * *